(12) United States Patent
Shaw

(10) Patent No.: US 10,846,740 B2
(45) Date of Patent: Nov. 24, 2020

(54) SINGLE CONVERSION ADVERTISEMENTS

(71) Applicant: Google LLC, Mountain View, CA (US)

(72) Inventor: Satyam Shaw, San Jose, CA (US)

(73) Assignee: Google LLC, Mountain View, CA (US)

( * ) Notice: Subject to any disclaimer, the term of this patent is extended or adjusted under 35 U.S.C. 154(b) by 1142 days.

(21) Appl. No.: 14/337,559

(22) Filed: Jul. 22, 2014

(65) Prior Publication Data
US 2014/0337133 A1 Nov. 13, 2014

Related U.S. Application Data

(63) Continuation of application No. 12/789,372, filed on May 27, 2010, now abandoned.

(51) Int. Cl.
*G06Q 30/00* (2012.01)
*G06Q 30/02* (2012.01)

(52) U.S. Cl.
CPC ......... *G06Q 30/0251* (2013.01); *G06Q 30/02* (2013.01); *G06Q 30/0245* (2013.01); *G06Q 30/0246* (2013.01); *G06Q 30/0254* (2013.01); *G06Q 30/0273* (2013.01); *G06Q 30/0275* (2013.01); *G06Q 30/0276* (2013.01); *G06Q 30/0277* (2013.01)

(58) Field of Classification Search
CPC .... G06Q 20/20; G06Q 20/201; G06Q 20/202; G06Q 20/203; G06Q 20/209; G06Q 30/02; G06Q 30/0207; G06Q 30/0235; G06Q 30/0241; G06Q 30/0273; G06Q 30/0633; G06Q 30/0641; G06Q 30/0643
USPC .............................................. 705/14.1, 14.73
See application file for complete search history.

(56) References Cited

U.S. PATENT DOCUMENTS 5,612,527 A * 3/1997 Ovadia ................ G06Q 20/201
235/375
6,076,071 A * 6/2000 Freeny, Jr. ................... 705/14.1
(Continued)

FOREIGN PATENT DOCUMENTS

| KR | 2000-0037274 | 7/2000 |
| KR | 2001-0089248 | 9/2001 |
| KR | 2010-0001944 | 1/2010 |

OTHER PUBLICATIONS

Avsar, et al. "Inventory Control Under Substitutable Demand: A Stochastic Game Application." Rutgers Department of Industrial Engineering, Wiley Publications, 2002. (Year: 2002).*
(Continued)

*Primary Examiner* — Luis A Brown
(74) *Attorney, Agent, or Firm* — Fish & Richardson P.C.

(57) ABSTRACT

This specification describes technologies relating to content presentation. In general, one aspect of the subject matter described in this specification can be embodied in methods that include the actions of receiving ad information from a seller; generating, using one or more processors, a single conversion ad using the received ad information, where the single conversion ad has an available inventory of one such that only a single conversion of the ad can be performed; transmitting the single conversion ad to one or more potential buyers; receive an input from one of the one or more potential buyers; and notifying the seller of the user input. Other embodiments of this aspect include corresponding systems, apparatus, and computer program products.

13 Claims, 6 Drawing Sheets

(56) References Cited

U.S. PATENT DOCUMENTS

| | | | | |
|---|---|---|---|---|
| 6,332,127 | B1* | 12/2001 | Bandera | G06Q 30/02 705/14.55 |
| 6,377,935 | B1* | 4/2002 | Deaton | G06Q 20/387 705/14.41 |
| 7,228,287 | B1* | 6/2007 | Samson | G06Q 30/02 705/14.13 |
| 7,356,477 | B1* | 4/2008 | Allan | G06Q 30/02 705/14.4 |
| 7,373,321 | B2* | 5/2008 | Collings | G06Q 30/06 705/35 |
| 7,472,077 | B2* | 12/2008 | Roseman | G06Q 30/02 705/26.44 |
| 7,536,319 | B2* | 5/2009 | Thakur | G06Q 30/08 705/26.3 |
| 7,720,708 | B1* | 5/2010 | Elkins, II | G06Q 30/0207 705/14.1 |
| 7,729,945 | B1 | 6/2010 | Katz et al. | |
| 8,301,494 | B2* | 10/2012 | Wills | G06Q 30/02 705/14.1 |
| 2001/0056376 | A1* | 12/2001 | Walker | G06Q 50/12 705/15 |
| 2003/0229542 | A1* | 12/2003 | Morrisroe | G06Q 30/0242 705/14.41 |
| 2004/0068459 | A1* | 4/2004 | Goulet | G06Q 40/04 705/37 |
| 2004/0116183 | A1* | 6/2004 | Prindle | H04N 21/4316 463/42 |
| 2004/0186783 | A1* | 9/2004 | Knight | G06Q 30/0601 705/16 |
| 2004/0225560 | A1* | 11/2004 | Lewis | G06Q 30/0235 705/14.35 |
| 2005/0222910 | A1* | 10/2005 | Wills | G06Q 30/02 705/22 |
| 2006/0020366 | A1* | 1/2006 | Bloom | B07C 3/02 700/226 |
| 2006/0178930 | A1* | 8/2006 | Kim | G06Q 30/02 705/14.13 |
| 2006/0178932 | A1* | 8/2006 | Lang | G06Q 30/0277 705/14.73 |
| 2006/0229945 | A1* | 10/2006 | Walker | G07F 17/3244 705/14.4 |
| 2007/0061211 | A1* | 3/2007 | Ramer | G06Q 20/12 705/25 |
| 2007/0067297 | A1* | 3/2007 | Kublickis | G06Q 30/02 |
| 2007/0100956 | A1 | 5/2007 | Kumar | |
| 2007/0198337 | A1* | 8/2007 | Coon | G06Q 30/0248 705/14.71 |
| 2007/0198490 | A1* | 8/2007 | Lee | G06Q 30/02 |
| 2007/0276729 | A1* | 11/2007 | Freer | G06Q 30/02 705/14.44 |
| 2008/0052169 | A1* | 2/2008 | O'Shea | G06Q 30/02 705/14.17 |
| 2008/0091529 | A1* | 4/2008 | Bailey | G06Q 30/0264 705/14.35 |
| 2008/0120160 | A1* | 5/2008 | Woo | G06Q 10/087 705/14.72 |
| 2008/0154708 | A1* | 6/2008 | Allan | G07G 1/01 705/1.1 |
| 2008/0207316 | A1* | 8/2008 | Burnett | G06Q 30/02 463/29 |
| 2008/0270251 | A1* | 10/2008 | Coelho | G06Q 30/0635 705/14.27 |
| 2008/0275786 | A1* | 11/2008 | Gluck | G06Q 30/0239 705/14.35 |
| 2008/0281676 | A1* | 11/2008 | Stahura | G06Q 30/0224 705/7.29 |
| 2009/0006182 | A1* | 1/2009 | Gammon | G06Q 30/0202 705/7.31 |
| 2009/0016507 | A1 | 1/2009 | Altberg et al. | |
| 2009/0070130 | A1* | 3/2009 | Sundaresan | G06Q 30/06 705/319 |
| 2009/0099902 | A1* | 4/2009 | Chatter | G06Q 30/0275 705/14.43 |
| 2009/0125350 | A1* | 5/2009 | Lessing | G06Q 10/0631 705/7.12 |
| 2009/0157749 | A1* | 6/2009 | Lessing | G06Q 10/063 |
| 2009/0198579 | A1* | 8/2009 | Lewis | G06Q 30/0248 705/14.47 |
| 2009/0281844 | A1* | 11/2009 | Probst | G06Q 10/02 705/5 |
| 2010/0030645 | A1* | 2/2010 | Watanuki | G06F 17/30781 705/14.53 |
| 2011/0112901 | A1* | 5/2011 | Fried | G06Q 30/0251 705/14.49 |
| 2011/0191714 | A1* | 8/2011 | Ting et al. | 715/805 |
| 2011/0225054 | A1* | 9/2011 | Morris | G06Q 30/0242 705/14.73 |
| 2012/0042025 | A1* | 2/2012 | Jamison | G06Q 10/107 709/206 |
| 2015/0154632 | A1 | 6/2015 | Jindal et al. | |

OTHER PUBLICATIONS

International Preliminary Report on Patentability from PCT International Application No. PCT/US2011/038092 dated Dec. 6, 2012, 6 pgs.

International Search Report from related PCT International Application No. PCT/US2011/038092 dated Jan. 18, 2012, 9 pages.

* cited by examiner

SINGLE CONVERSION ADVERTISEMENTS

CROSS REFERENCE TO RELATED APPLICATION

This application is a continuation application of, and claims priority to, pending U.S. patent application Ser. No. 12/789,372, filed on May 27, 2010, entitled "Single Conversion Advertisements". The disclosure of the foregoing application is incorporated herein by reference in its entirety.

BACKGROUND

The present disclosure relates to content presentation.

Advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a webpage or a mobile application, as an impression. An advertising system can include an ad in a webpage, for example, in response to one or more keywords in a user search query input to a search engine. If a user selects the presented ad (e.g., by "clicking" the ad), the user is generally taken to another location associated with the ad, for example, to another, particular web page.

SUMMARY

This specification describes technologies relating to content presentation.

In general, one aspect of the subject matter described in this specification can be embodied in methods that include the actions of receiving ad information from a seller; generating, using one or more processors, a single conversion ad using the received ad information, where the single conversion ad has an available inventory of one such that only a single conversion of the ad can be performed; transmitting the single conversion ad to one or more potential buyers; receive an input from one of the one or more potential buyers; and notifying the seller of the user input. Other embodiments of this aspect include corresponding systems, apparatus, and computer program products.

These and other embodiments can optionally include one or more of the following features. Receiving ad information includes receiving a description of the ad and seller contact information. The description of the ad includes user specified keywords. Receiving ad information includes receiving ad payment to be deducted according to one or more ad payment metrics. Any remaining portion of the ad payment is refunded to the seller after a conversion of the single conversion ad occurs. Generating the single conversion ad includes extracting keywords for use in ad targeting from the received ad information. Receiving an input from one of the potential buyers further includes: receiving a user selection of the ad; presenting seller contact options to the user; and receiving a user selection of a user contact option. Presenting seller contact options further includes determining temporal restrictions on contact information; and presenting seller contact information in compliance with the temporal restrictions.

Receiving an input from one of the potential buyers further includes: receiving a user selection of the ad; directing the user to a landing page including additional ad information and seller contact options; and receiving a user selection of a user contact option. Receiving an input from one of the potential buyers further includes receiving a user selection of the single conversion ad; presenting a bidding interface to the user; and receiving a user bid submission. Notifying the seller includes notifying the seller of the user's submitted bid. Notifying the seller includes routing a telephone call to the seller from the potential buyer. Notifying the seller includes routing an email to the seller from the potential buyer. The method further includes receiving user comments on the single conversion ad; providing the comments to the seller; and receiving seller input updating the single conversion ad. Presenting the single conversion ad to one or more potential buyers includes presenting the single conversion ad along with search results responsive to a relevant query. The method further includes presenting the single conversion ad to additional potential buyers until a conversion of the single conversion ad In general, one aspect of the subject matter described in this specification can be embodied in methods that include the actions of receiving a search query from a user; identifying one or more search results responsive to the search query; identifying, using one or more processors, a single conversion ad responsive to the search query; presenting the search results and single conversion ad to the user; receiving a user selection of the single conversion ad; and providing seller contact information to the user in response to the user selection. Other embodiments of this aspect include corresponding systems, apparatus, and computer program products.

The systems and techniques described here may provide one or more of the following advantages. Ads can be generated by users wishing to sell only one or a small amount of an item. Potential buyers can be provided with functionality to purchase, bid on, or contact the seller of an item. Additionally, ads can be efficiently selected so that they are only shown to potential buyers with whom the seller can interact.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Users can be presented with content items (e.g., ads). Content items can be displayed in various forms on a user device (e.g., a mobile phone, PDA, desktop computer). Different ways in which the user interacts with the content item can be counted as a conversion. For example, the user can click on the content item to reach a particular landing page, the user can buy a product from the landing page, or the user can interact with the content item in other ways. These conversions can be tracked in order to, for example, charge advertisers for the conversion.

In some implementation, a single conversion content item (e.g., a single conversion ad) can be presented. A single conversion content item is one that is converted only once. For example, a classified ad presented to sell a particular user item. When the single conversion content item for an item is selected by a potential buyer, the seller can be contacted to complete a transaction, the potential buyer can submit a bid, or additional information on the item can be provided. When the transaction is complete, the conversion can be logged and the content item withdrawn from presentation to potential buyers. Thus, the single conversion content item has an inventory of one item available for purchase by a user (e.g., resulting in a single conversion event).

In some alternative implementations, the content item can be a limited conversion content item having an specified inventory greater than one. For example, a user can have three of an item to sell. In this scenario, the content item is no longer presented once all items in the inventory have been sold (e.g., three conversions of the item have occurred corresponding to the available inventory). Limited conversion content items can be generated, presented, and converted in a similar manner as described below with respect to single conversion content items, with the addition of more than one conversion being possible for limited conversion content items.

While reference will be made below to advertising systems and methods, other forms of content including other forms of sponsored content can be managed, presented, and tracked in accordance with the description below.

Figure 1:
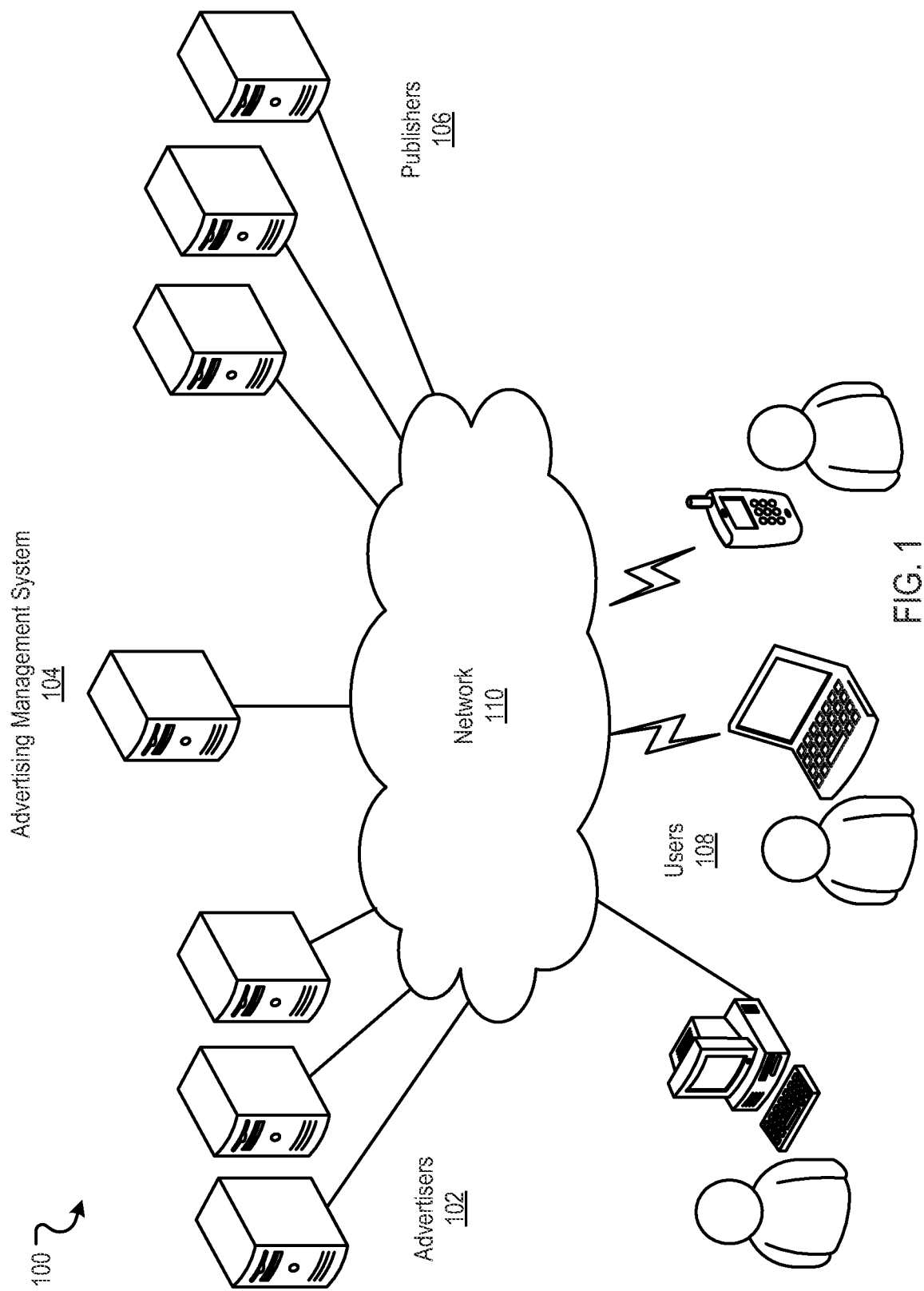
FIG. 1 is a diagram of an example content presentation system.

FIG. 1 is a block diagram of an example content presentation system 100. In some implementations, one or more advertisers 102 can directly, or indirectly, enter, maintain, and track ad information in an advertising management system 104. Though reference is made to advertising, other forms of content, including other forms of sponsored content, can be delivered by the system 100. The ads can be in the form of graphical ads, such as banner ads, text only ads, image ads, barcode ads (e.g., an ad including one or more barcodes, for example, for use in redeeming the ad), audio ads, video ads, animated ads, ads combining one or more of any of such components, etc. The ads can also include embedded information, such as links, meta-information, and/or machine executable instructions. One or more publishers 106 may submit requests for ads to the system 104. The system 104 responds by sending ads to the requesting publisher 106 for placement on or association with one or more of the publisher's content items (e.g., web properties). Example web properties can include web pages, television and radio advertising slots, or print media space.

Other entities, such as users 108 and the advertisers 102, can provide usage information to the system 104, such as, for example, whether or not a conversion (e.g., a purchase or other interaction) or a click-through related to an ad (e.g., a user has selected an ad) has occurred. This usage information can include measured or observed user behavior related to ads that have been served. The system 104 may perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser integrates the requested content with one or more of the ads provided by the system 104. The content and ads can be sent/rendered to the users 108 that requested the content for presentation in a viewer (e.g., a browser or other content display system). In some implementations, the content and ads are requested separately. For example, while requested content is being rendered by a user browser, the browser can process a tag in the rendering content requesting an ad for placement within the content. The ad can then be requested and incorporated into the content when received. In some other implementations, the requested ad(s) are provided to the content provider (e.g., publishers 106) such that the content including the ad is sent to the user 108 for display. Finally, in some other implementations, the ads can be sent separately to the user 108 for local combination by the user's browser. The content server can transmit information about the ads back to the advertisement server, including information describing how, when, and/or where the ads are to be rendered (e.g., in HTML or JavaScript™)

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number can depend, for example, on the search results, the amount of screen or page space occupied by the search results, the size and shape of the ads, etc. The request for ads may also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

In some implementations, the advertisement management system 104 can use an auction process to select ads from the advertisers 102. For example, the advertisers 102 may be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the system 104. This combined information can then be forwarded to the users 108 that requested the content. The search results can be maintained as distinct from the ads, so as not to confuse the user between paid ads and presumably neutral search results.

In some implementations, one or more publishers 106 submit requests for ads to the advertising management system 104. The system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the user 108, e.g., by the execution of a particular script (e.g., javascript) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the advertising management system 104 for placement in the mobile application when accessed by a user (e.g., when a particular page of a mobile application is loaded on the mobile device).

Figure 2:
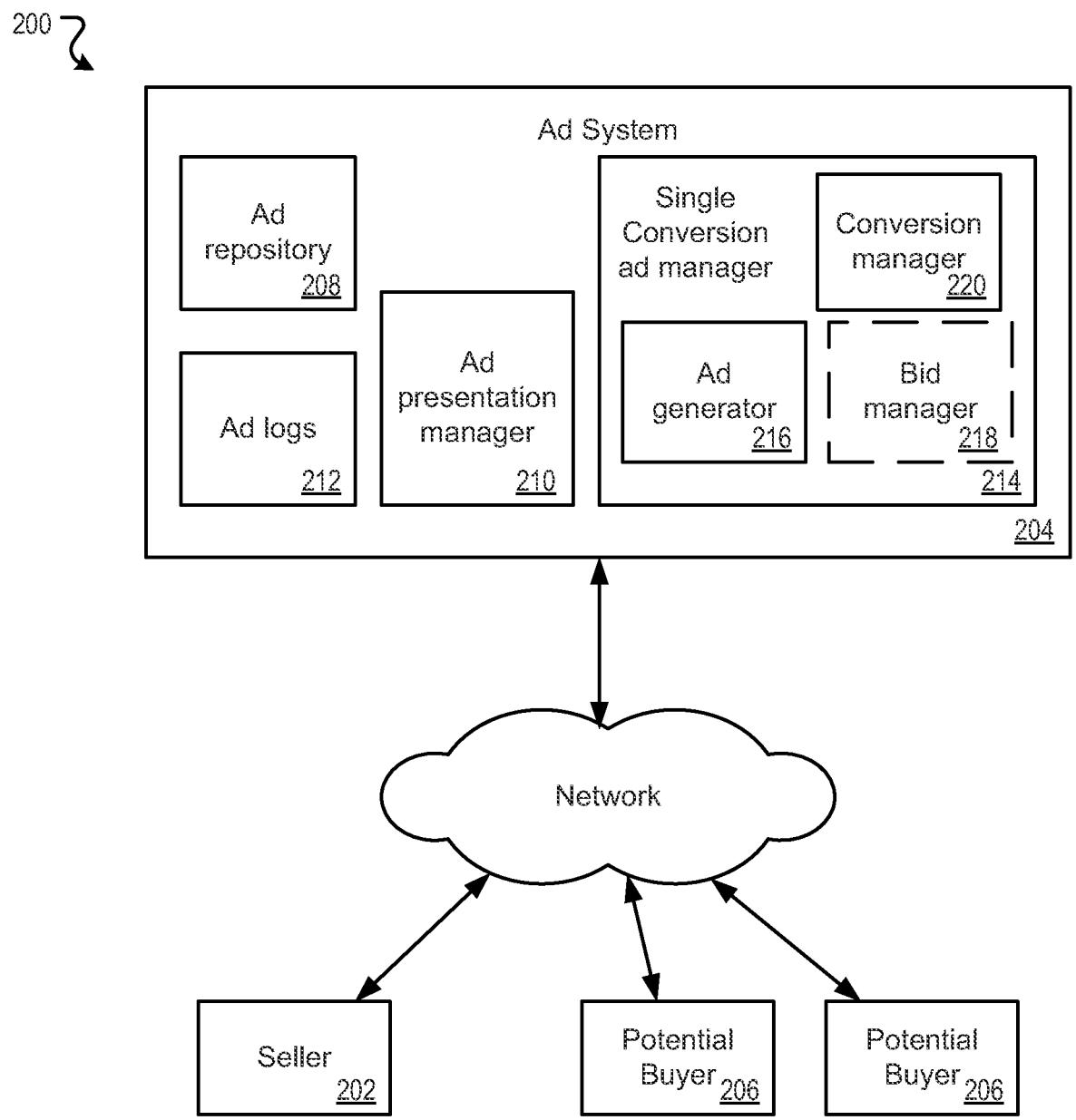
FIG. 2 is a block diagram of an example system for generating and presenting single conversion ads.

FIG. 2 is a block diagram of an example system 200 for generating and presenting single conversion ads. In the system 200, a seller 202 can submit a single conversion ad to an ad system 204. The ad system 204 can transmit ads for presentation, including the single conversion ad submitted by the seller 202, to users including potential buyers 206. In some implementations, the ad system can also transmit limited conversion ads in which a finite inventory of an item is available. In some implementations, the ad system 204 can interact with a search system, for example presenting ads alongside search results. In some implementations, the ad system 204 can interact with content publishers, for example, providing ads to publishers or users for presentation along with web content, e-mail, or other content.

The ad system 204 can include components for storing, recording, and presenting both single conversion ads and multiple conversion ads (e.g., ads that can record conversions from multiple users). The ad system 204 can include an ad repository 208, ad logs 212, ad presentation manager 210, and classified ad manager 214. The ad repository 208 can store ads submitted by sellers including the seller 202. The ad presentation manager 210 can identify ads in the ad repository 208 to present to a user, for example based on various criteria such as keywords in a search query, web page content, context, location, ad financials (e.g., cost per impression). The ad logs 212 can store ad presentation and conversion events (e.g., users an ad is presented to, timestamps, ad identifiers).

The single conversion ad manager 214 can contain components for generating and managing single conversion ads (and/or limited conversion ads). For example, the single conversion ad manager 214 can include an ad generator 216, a conversion manager 220, and optionally a bid manager 218. In some implementations, the single conversion ad manager 214 can be a separate system from the ad system 204. Alternatively, as shown here, the single conversion ad manager 214 can be incorporated in the ad system 204.

The ad generator 216 can create single conversion ads and/or limited conversion ads from user input. For example, the ad generator 216 can provide a user interface for users to provide information about their single conversion ad and can include a keyword generator/extractor to identify keywords for ad targeting. Users may provide a one time payment through the ad generator 216, from which the ad generator 216 can calculate cost metrics for presenting the single conversion ad (e.g., cost per impression or cost per click value used for the single conversion ad). After generation, a single conversion ad can be stored in the ad repository 208, or in a separate single conversion ad repository (not shown). In some alternative implementations, the ad generator 216 can generate the single conversion ads from information in other postings by the user, for example, an electronic bulletin board or classified ads posting by the seller.

The conversion manager 220 can manage the interactions between potential buyers 206 and the ad system 204. For example, when a potential buyer 206 selects an ad, information can be provided and/or received by the conversion manager 220. In some examples, the conversion manager 220 can provide contact information for the seller 202 to the potential buyer 206. The contact information can be routed through the ad system. For example, for privacy reasons, the contact information can include anonymous email sent through a web form, a temporary email address that can forward to the seller's 202 email address, and/or a phone call can be routed to the seller's 202 phone using IP telephony or a temporary phone number. The contact information can vary according to one or more criteria. For example, at night the seller 202 may not be contactable by phone such that only an email contact option is presented.

The bid manager 218 can optionally be used in single conversion ad managers 214 that provides functionality to bid for an item or service for sale. For example, a single conversion ad can have a starting bid and users that view the single conversion ad can submit their own bid. The bidding manager 218 can record all bids for a single conversion ad and send the bids to the seller 202, who may select the bid they want (presumably the highest, but also possibly the easiest to ship to, a bid from an acquaintance, etc). In some examples, the bidding time can have an expiration time after which the highest bid is automatically accepted.

The conversion manager 220 can receive comments or other information from the potential buyer 206 and provide that information to the seller 202. The seller 202 may chose to act on this information by modifying their ad (e.g., changing a description, price, etc) through the ad generator 216.

In some implementations, a balance of money can remain with a single conversion ad after the ad's conversion, for example if a bid is accepted before all impressions purchased are used. In this case, the user can be credited the balance of money.

Figure 3:
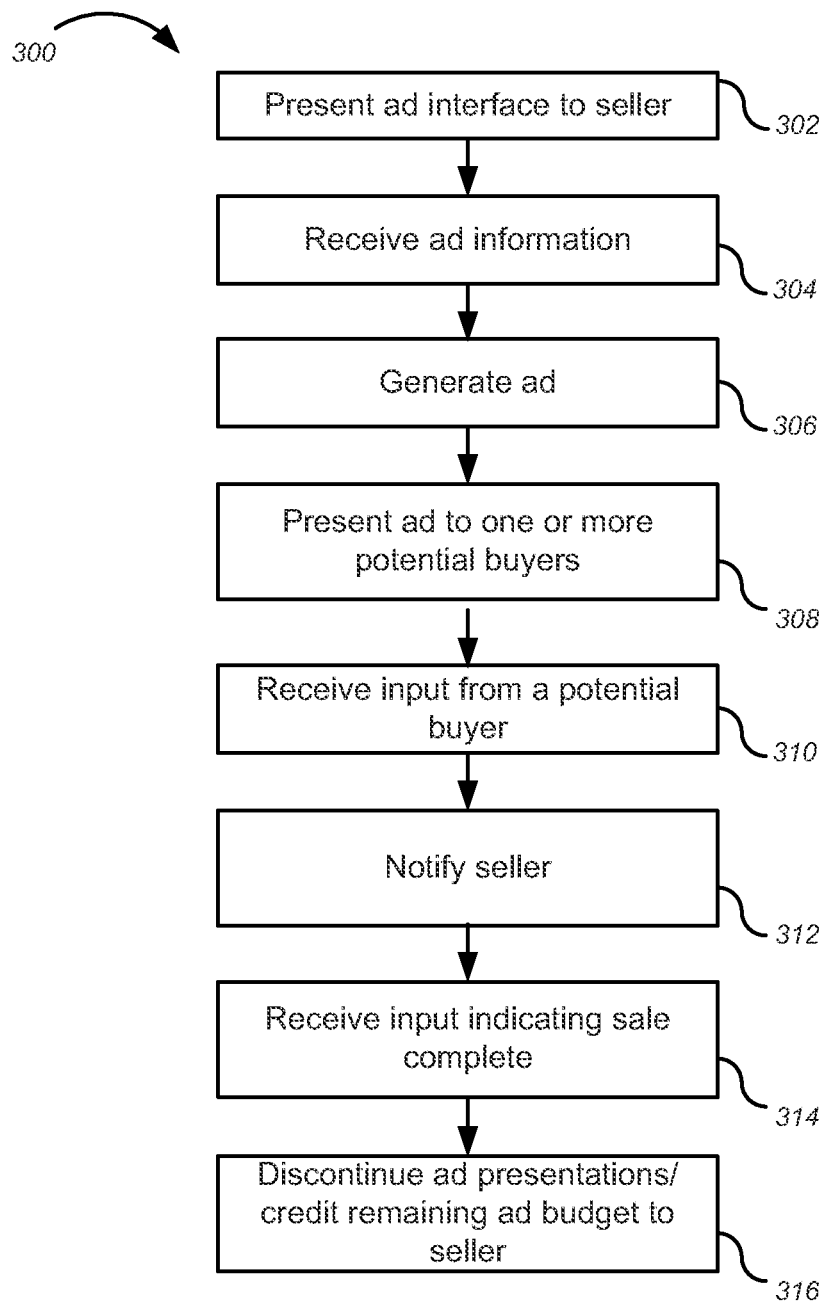
FIG. 3 is a flowchart of an example method for generating and presenting a sing conversion ad.

FIG. 3 is a flowchart of an example method 300 for generating and presenting a single conversion ad. In some implementations, the method 300 can be performed by a processor executing instructions in a computer-readable storage medium. For example, the method 300 can be performed by the ad system 204 of FIG. 2.

An ad interface is presented (302) to a seller (e.g., seller 202). For example, the ad system (e.g., ad system 204) can provide to the seller a web page, application plug-in, application, etc. containing elements into which information about an ad can be provided.

Ad information is received (304), for example a seller provides a description of the ad features (e.g., a name of the item, a description of the item, a price or bidding range, location targeting information). In some implementations, the user devises keywords for ad targeting. In some implementations, a one-time payment is collected.

The ad is generated (306). The ad can be generated from the user information and one or more templates. Additionally, targeting keywords can be generated or extracted from the ad information. For example, an ad listing the sale of a sailboat may have the keywords 'boat,' 'sailboat,' 'lake,' and 'vacation' generated by the ad system based on the ad information provided by the seller.

The ad is presented (308) to one or more potential buyers (e.g., potential buyers 206). In some implementations, the ad can be presented with particular content, e.g., search results, web page content, etc. A technique for providing a single conversion ad with search results is described in greater detail below with respect to FIG. 4.

Input is received (310) from a potential buyer. For example, a potential buyer can click through an ad and select to pay the advertised price, place a bid in the ad, and/or retrieve additional information about the ad and contact information relating to the ad. In some implementations, the potential buyer can provide input directly to the ad (e.g., a bid price or to initiate contact with the seller). In some other implementations, selecting the ad results in the presentation of additional information. For example, the potential buyer can be directed to a landing page associated with the single conversion ad that provide additional information and one or more options for contacting the seller to purchase the item identified by the single conversion ad.

In some implementations, a user can perform other interactions including reserving the item for some specified time in which the user can complete the conversion (e.g., a time in which the user can purchase the item). The user can use the specified time to complete the transaction including payment as well as to interact with the seller, e.g., to ask questions about the item or service associated with the ad. In some implementations, once the item has been reserved, the ad is not presented to any other potential buyers unless the user fails to complete the conversion within the specified time.

The seller is notified (312) of the input from a potential buyer. For example, the seller can receive, through a user interface of the ad system, a bid or comment submitted; the seller can receive an email from the sender requesting purchase; and/or the seller can receive a call facilitated by the ad system form the potential buyer.

Input indicating that a sale is competed is received (314). For example, the seller can coordinate a sale by initiating a telephone call and/or sending an email as well as submit information to the ad system. In some implementations in which a sale is automated by the ad system, the ad system can generate an internal event indicating the sale. For example, a seller can specify a bidding time that can have an expiration time after which the highest bid is automatically accepted by the ad system. As part of accepting the bid, the ad system can generate a report of the sale indicating the sale is complete.

The ad is discontinued and the remaining ad budget is credited (316) to the seller. For example, the ad can be flagged as inactive or deleted. Since only one item is available for purchase (inventory of one), once a conversion has occurred the ad is no longer displayed. This is in contrast to ads associated with a large inventory of items available for purchase by one or more buyers. In accordance with the financial agreement associated with the ad, an unused ad payment used to fund the ad can be returned or refunded to an account controlled by the seller.

Figure 4:
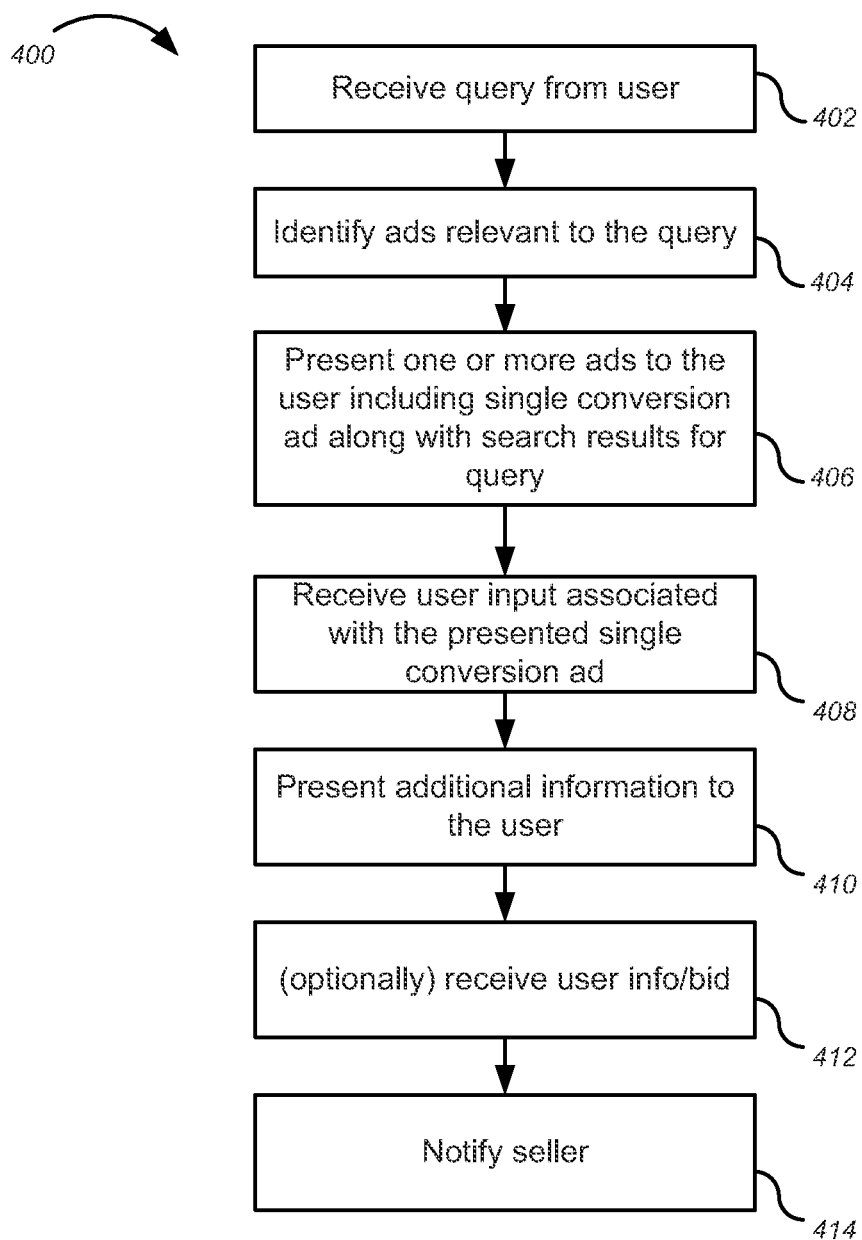
FIG. 4 is a flowchart of an example method for presenting a single conversion ad.

FIG. 4 is a flowchart of an example method 400 for presenting a single conversion ad. In some implementations, the method 400 can be performed by a processor executing instructions in a computer-readable storage medium. For example, the method 400 can be performed by the ad system 204

A search query is received (402). A user can enter a search query into a search engine. The search engine, in addition to compiling a resulting list of search results, can route the query to an ad system.

Ads relevant to the query are identified (404). For example, ads with keywords that are the same, similar to, or synonymous with words in the search query can be identified. The identified ads can include a collection of candidate ads that match the keywords or other criteria. The ad system can then select particular ads from the collection of candidate ads. In some implementations, the ads are ranked according to one or more scoring criteria (e.g., based on the degree of match between the query and the ad keywords). One or more top scoring ads can be selected. In particular, the selected ads include a single conversion ad.

In some implementations, the location of the user and location targeting information associated with an ad can be used in identifying or ranking ads. For example, a single conversion ad having location targeting information indicating personal delivery in a twenty mile radius (e.g., ads for a couch or firewood) from the seller can have presentation limited to those potential buyers within the twenty mile radius (e.g., they can be omitted from candidate ads or can have a large location based penalty to the score when ranking candidate ads). In another example, an ad with location targeting information indicating a ship-from address (e.g., ads for a book, collectable, or handbag) can be ranked in part based on estimated shipping costs from the seller to the user.

One or more selected ads are presented (406) to the user along with the search results. In some implementations, the ads can be formatted or differentiated from the search results to indicate which of the presented elements are ads and which are search results. The presented ads include the selected single conversion ad.

User input associated with the single conversion ad is received (408). In some implementations, a graphical ad is clickable, for example, to execute an incorporated link to a landing page. In some other implementations, a particular portion of the ad can be interactive, such as a text field to enter a bid, a button to reserve the item, or a call button to initiate a telephone call (or voice over IP call) between the mobile computing device displaying the ad and the seller associated with the ad. For example, the single conversion ad can include additional logic facilitating interaction including additional information that can be presented to a user in response to a particular selection associated with the ad.

Additional information is presented (410) to the user. In some implementations, the ad can change dynamically in response to user interaction, such as by changing the text, displaying an overlay above the ad, and/or the creation of graphic element that pops-up or expand the ad. In some implementations, the user's browser can be directed to a landing page with additional information. The additional information can include more details about the sales item (e.g., mileage reading on a car's odometer), contact information for the seller, presentation of a comment portion allowing the user to comment on the ad, presentation of bidding information, etc.

User input can optionally be received (412). The user may provide additional input, for example, to select a contact option, place a bid, reserve the item, comment, etc. For example, a user may click on a button to initiate a telephone call, enter text into a bid value field, select a choice from a drop down menu to select a method of contact (e.g., email, telephone, instant message), and/or enter a comment to be sent to the seller.

The seller is notified (414) of the interaction. For example, if the user commented, the comment can be forwarded to the seller. If the user selected a contact option, the ad system can facilitate the communication such as by sending an email from the user to the seller, initiating an IP telephony call between the user and seller, initiating a telephone call over the public switched telephone network, or creating an instant message from the user to the seller.

Figure 5:
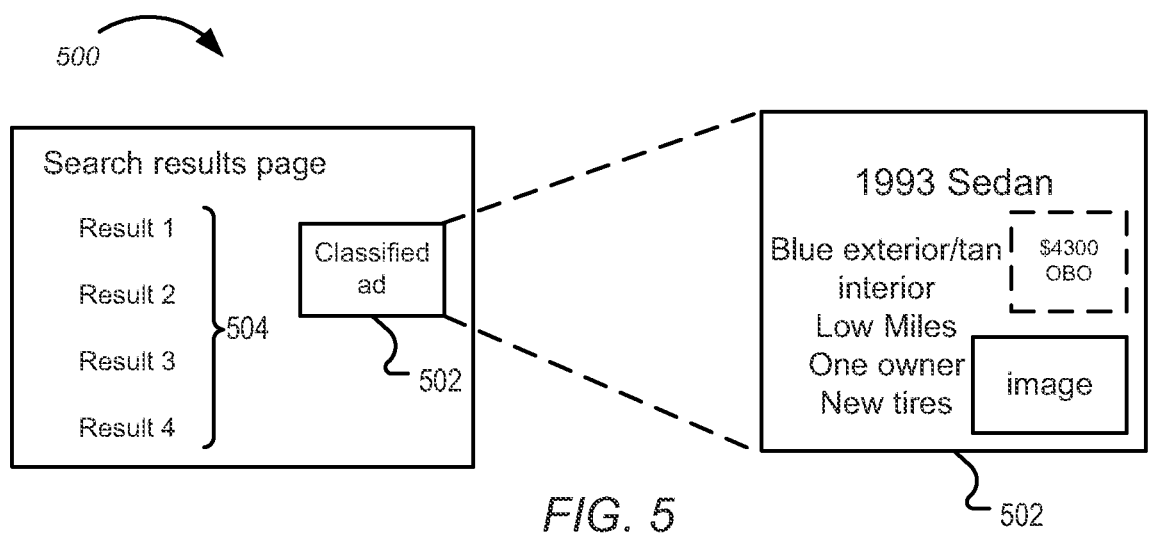
FIG. 5 is an example search results page with a single conversion ad.

FIG. 5 is an example search results page 500 with a single conversion ad 502. In this example, the results page 500 shows results shows search results 504 generated in response to a search query 'Sedan' submitted by a user associated with a particular location (e.g., location can be identified for the user based on a laptop with GPS, cell phone with tower triangulation, etc) in San Francisco. The single conversion ad 502 was created with the keyword 'Sedan' by a seller with a home address in the San Francisco area. The single conversion ad 502 was selected as relevant to the search query by an ad manager because both a keyword and city associated with the ad matched a keyword and city associated with the search query.

Figures 6A, 6B:
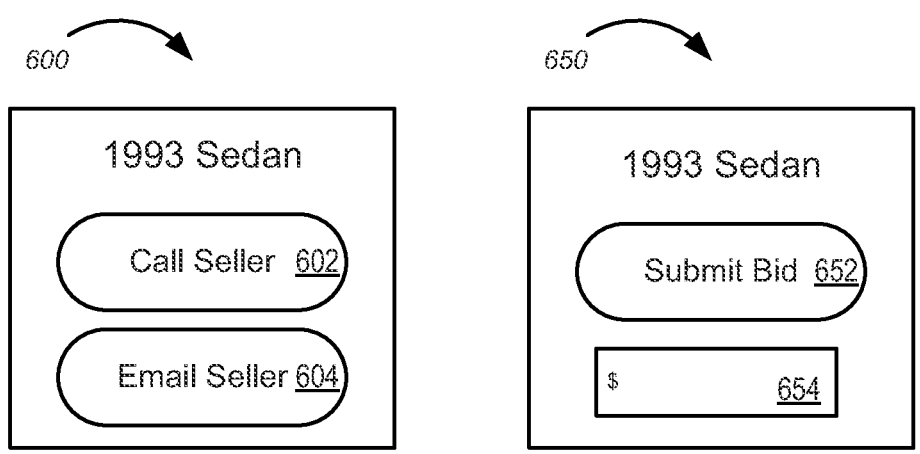
FIG. 6A is an example response to user selection of single conversion ad.
FIG. 6B is an example response to user selection of single conversion ad.

FIG. 6A is an example response 600 to user selection of single conversion ad. The response 600 can display to a potential buyer graphical interface elements, such as buttons 602 and 604, for contacting the seller of an ad. The button 602 can initiate a telephone call, for example, by routing a call from the seller to the device displaying the response 600 or to a telephone number entered by the buyer. The button 604 can initiate an email communication, for example, by providing a form to create an email message, or by displaying an anonymized email address that forward to the seller's email address.

FIG. 6B is an example response 650 to user selection of single conversion ad. The response 650 can receive a bid placed by a potential buyer. An entry element 654 can receive a bid. Although this example shows the entry element 654 formatted to receive a bid in a dollar amount, alternative entry elements 654 can be formatted to receive a nonmonetary bid, such as a payment in kind, trade, or barter bid. A button 652 can be used by the buyer to submit the bid in the entry element 654.

Figure 7:
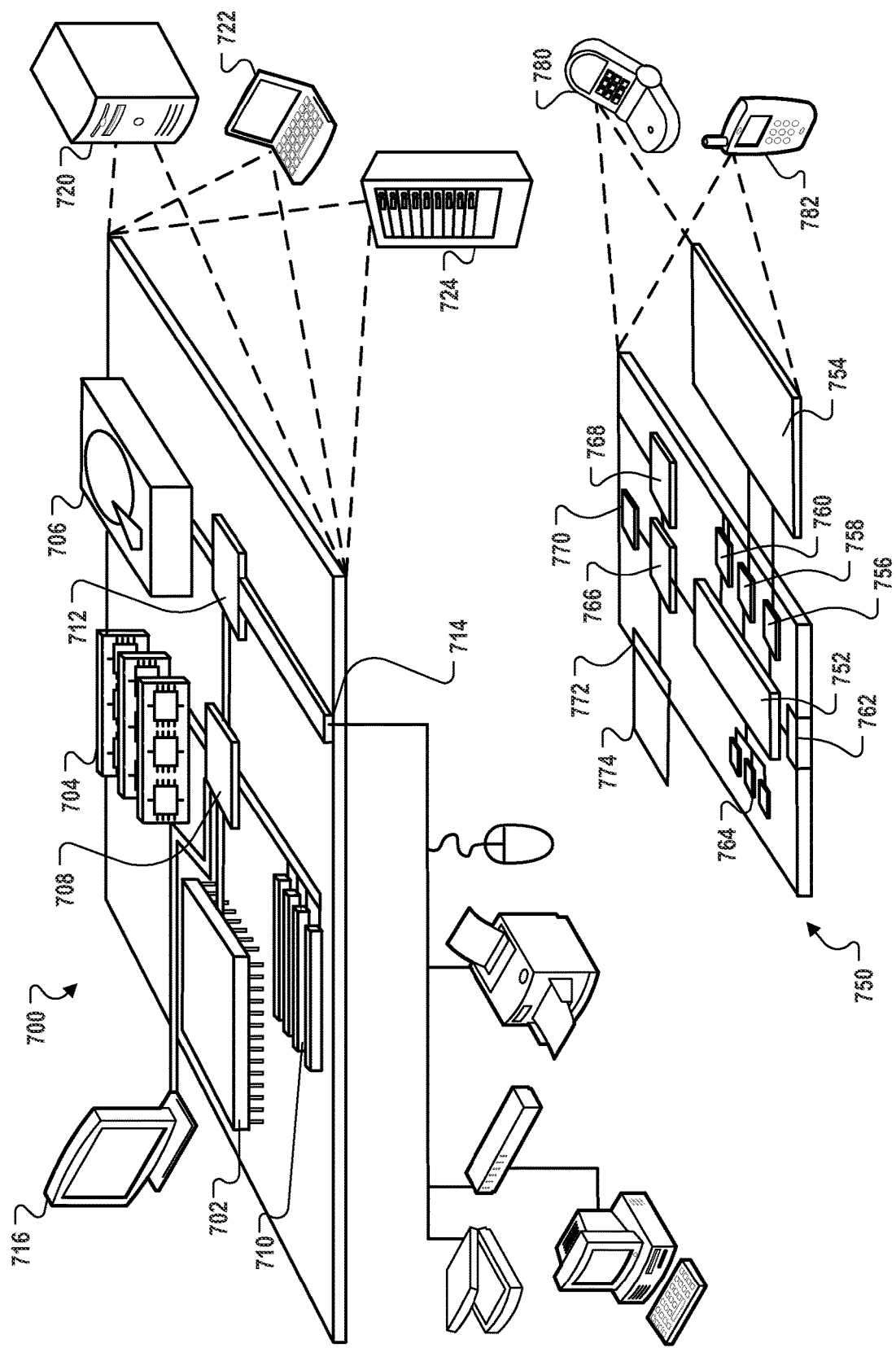
FIG. 7 shows an example of a computing device and a mobile computing device that can be used in connection with computer-implemented methods and systems described in the present specification.

FIG. 7 shows an example of a computing device 700 and a mobile computing device that can be used to implement the techniques described herein the present specification. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

identifying, by one or more computers, a given advertisement from an inventory associated with an online advertisement system;

determining, by the one or more computers, that the given advertisement is only capable of providing a predefined number of conversions based on the given advertisement being for a product having a limited available inventory that is limited to the predefined number, the predefined number being greater than one;

receiving, by the one or more computers, multiple requests for content from two or more user devices;

responding, by the one or more computers, to the multiple requests with an advertisement, including:

determining, by the one or more computers and for at least some of the requests, that the limited available inventory of the product of the given advertisement is greater than zero; and providing, by the one or more computers, the given advertisement in response to the determination that the limited available inventory of the product is greater than zero;

reserving, by the one or more computers, the product for a specified amount of time after providing the given advertisement during which purchase of the product is able to be completed through a user device that received the given advertisement;

during the specified amount of time, not providing, by the one or more computers, the given advertisement in response to other requests from other user devices;

determining, by the one or more computers, that the purchase of the product was not completed during the specified amount of time;

in response to the purchase of the product not being completed during the specified amount of time, providing, by the one or more computers, the given advertisement in response to one or more of the multiple requests;

receiving, by the one or more computers and over a network, conversion information indicating one or more conversions attributed to the given advertisement when provided responsive to the one or more of the multiple requests; and determining, by the one or more computers and based on a detected number of conversions and the predefined number of conversions, that the limited available inventory has been depleted to a depleted level at which additional conversions provided by further distribution of the given advertisement will fail to be fulfilled because of the depleted level of the inventory of the product;

discontinuing, by the one or more computers, distribution of the given advertisement in response to subsequent requests following the determination that additional conversions provided by further distribution of the given advertisement will fail to be fulfilled because of the depleted level of the inventory of the product; and distributing, by the one or more computers, different advertisements in response to the subsequent requests.

2. The method of claim 1 further comprising generating the given advertisement based on received advertisement information wherein the received advertisement information comprises: a description, seller contact information of a seller, and a ship-from address.

3. The method of claim 2 wherein the received advertisement information comprises a payment to be deducted from an account according to one or more advertisement payment metrics.

4. The method of claim 2 wherein generating the given advertisement further comprises extracting keywords from text associated with the received advertisement information for use in advertisement targeting.

5. The method of claim 1 further comprising:
detecting a first conversion by a first buyer after the given advertisement is provided;
receiving a plurality of bids for the product associated with the first portion of advertisements; and
receiving seller selection of a bid associated with the first buyer.

6. The method of claim 1, further comprising:
receiving user comments associated with the given advertisement;
providing the comments to a seller;
after providing the comments, receiving seller input; and
updating the given advertisement with the seller input.

7. The method of claim 1 wherein the given advertisement comprises:
selecting one or more potential buyers to which to provide the given advertisement based on an estimated shipping cost from a seller to a potential buyer; and
providing the given advertisement to the selected potential buyers.

8. A system comprising:
one or more processors; and
a computer-readable medium coupled to the one or more processors having instructions stored thereon which, when executed by the one or more processors, cause the one or more processors to perform operations comprising:
identifying a given advertisement from an inventory associated with an online advertisement system;
determining that the given advertisement is only capable of providing a predefined number of conversions based on the given advertisement being for a product having a limited available inventory that is limited to the predefined number, the predefined number being greater than one;
receiving multiple requests for content from two or more user devices;
responding to the multiple requests with an advertisement, including:
determining, for at least some of the requests, that the limited available inventory of the product of the given advertisement is greater than zero; and
providing the given advertisement in response to the determination that the limited available inventory of the product is greater than zero;
reserving the product for a specified amount of time after providing the given advertisement during which purchase of the product is able to be completed through a user device that received the given advertisement;
during the specified amount of time, not providing the given advertisement in response to other requests from other user devices;
determining that the purchase of the product was not completed during the specified amount of time;
in response to the purchase of the product not being completed during the specified amount of time, providing the given advertisement in response to one or more of the multiple requests;
receiving, over a network, conversion information indicating one or more conversions attributed to the given advertisement when provided responsive to the one or more of the multiple requests; and
determining, based on a detected number of conversions and the predefined number of conversions, that the limited available inventory has been depleted to a depleted level at which additional conversions provided by further distribution of the given advertisement will fail to be fulfilled because of the depleted level of the inventory of the product;
discontinuing distribution of the given advertisement in response to subsequent requests following the determination that additional conversions provided by further distribution of the given advertisement will fail to be fulfilled because of the depleted level of the inventory of the product; and
distributing different advertisements in response to the subsequent requests.

9. The system of claim 8, the operations further comprising generating the given advertisements based on received advertisement information wherein the received advertisement information comprises: a description, seller contact information of a seller, and a ship-from address.

10. The system of claim 8 wherein the received advertisement information comprises a payment to be deducted from an account according to one or more advertisement payment metrics.

11. A non-transitory computer storage medium encoded with a computer program, the program comprising instructions that when executed by data processing apparatus cause the data processing apparatus to perform operations comprising:
identifying a given advertisement from an inventory associated with an online advertisement system;
determining that the given advertisement is only capable of providing a predefined number of conversions based on the given advertisement being for a product having a limited available inventory that is limited to the predefined number, the predefined number being greater than one; and receiving multiple requests for content from two or more user devices;

responding to the multiple requests with an advertisement, including:

determining, for at least some of the requests, that the limited available inventory of the product of the given advertisement is greater than zero; and providing the given advertisement in response to the determination that the limited available inventory of the product is greater than zero;

reserving the product for a specified amount of time after providing the given advertisement during which purchase of the product is able to be completed through a user device that received the given advertisement;

during the specified amount of time, not providing the given advertisement in response to other requests from other user devices;

determining that the purchase of the product was not completed during the specified amount of time;

in response to the purchase of the product not being completed during the specified amount of time, providing the given advertisement in response to one or more of the multiple requests;

receiving, over a network, conversion information indicating one or more conversions attributed to the given advertisement when provided responsive to the one or more of the multiple requests; and determining, based on a detected number of conversions and the predefined number of conversions, that the limited available inventory has been depleted to a depleted level at which additional conversions provided by further distribution of the given advertisement will fail to be fulfilled because of the depleted level of the inventory of the product;

discontinuing distribution of the given advertisement in response to subsequent requests following the determination that additional conversions provided by further distribution of the given advertisement will fail to be fulfilled because of the depleted level of the inventory of the product; and distributing different advertisements in response to the subsequent requests.

12. The computer storage medium of claim 11, the operations further comprising generating the given advertisement based on received advertisement information wherein the received advertisement information comprises: a description, seller contact information of a seller, and a ship-from address.

13. The computer storage medium of claim 11 wherein the received advertisement information comprises a payment to be deducted from an account according to one or more advertisement payment metrics.

\* \* \* \* \*

UNITED STATES PATENT AND TRADEMARK OFFICE
CERTIFICATE OF CORRECTION

| | |
|---|---|
| PATENT NO. | : 10,846,740 B2 |
| APPLICATION NO. | : 14/337559 |
| DATED | : November 24, 2020 |
| INVENTOR(S) | : Shaw |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1221 days.

Signed and Sealed this
Twenty-fifth Day of October, 2022

Katherine Kelly Vidal
*Director of the United States Patent and Trademark Office*